United States Patent Office 2,750,404
Patented June 12, 1956

2,750,404

RESOLUTION OF RACEMIC PHENYLSERINE THROUGH ITS RACEMIC CYCLOHEXYL ESTER AND PRODUCTS OBTAINED

Alberto Vercellone and Carlo Giuseppe Alberti, Milan, Italy, assignors to Farmaceutici Italia S. A., a corporation of Italy No Drawing. Application June 18, 1952,
Serial No. 294,258

Claims priority, application Italy November 5, 1951

3 Claims. (Cl. 260—471)

Among the general methods known for resolving racemic substances into their optical antipodes is the method of salification with an optically active acid or base, a necessary—though not sufficient—condition being in this case that the racemic substance be a base or an acid respectively.

Thus in the case of compounds with basic functionality it is possible in many cases to resolve the racemic substance into the optical antipodes by salifying with an appropriate optically active acid (e. g. d-tartaric acid) and by fractional crystallization from a convenient solvent; as, for example, in the process for resolving norephedrine (threo-1-phenyl-2-amino-1-propanol) into its optical antipodes.

Now it is an object of the present invention to provide a process for resolving racemic amino acids, which is essentially characterized in that the amino acids are resolved through their racemic esters by applying to the latter the method of salification with an optically active acid, followed by fractional crystallization. The advantage of this process is evident in the case of those amino acids—forming the majority thereof—which are obtained through the respective esters. But also with the others, for which the process according to the invention comprises a previous step of esterification, said process may result in certain cases advantageous over the methods followed heretofore, as is illustrated in the particular case specified hereinafter by way of example.

The particular case described hereinafter by way of example is that of threo-α-amino-β-hydroxy-β-phenyl-propionic acid, or threo-β-phenylserine.

The resolution of β-phenylserine into its optical antipodes has already been obtained by means of fractional crystallization of a salt of an alkaloid, e. g. quinine, with an N-acyl-derivative of β-phenylserine.

Instead, according to the present invention, racemic β-phenylserine is transformed into a racemic ester, which then is salified with an optically active acid and subjected to fractional crystallization from an appropriate solvent.

Threo-β-phenylserine is important for the synthesis of chloramphenicol (according, for example, to applicants' recent patent applications in United States Nos. 176,246, now abandoned, 244,271, 244,273, 244,274, 244,275), which being an optically active compound involves resolution into its optical antipodes.

The advantages of the process according to the invention over the above mentioned known process for resolving racemic β-phenylserine (as is obtained with the ordinary synthesis of β-phenylserine (E. Eolenmeyer and E. Früstück, Ann. 284, 36 (1895) and German Patent 632,424) are evident, be it because using an optically active acid will always be much cheaper than using an optically active alkaloid, be it owing to the simplification of the operational scheme, since in the further stages of synthesis of chloramphenicol, phenylserine ester is a necessary intermediate and, therefore, acylation and subsequent saponification are dispensed with.

In particular it has been found, and forms a further object of the present invention, that racemic threo-β-phenylserine (as well as erythro or mix threo-erythro) can be transformed into its cyclohexyl ester, and this can be resolved by means of salification with 1-pyrrolidone carboxylic acid (1-pyroglutamic acid) and fractional crystallization e. g. from ethanol, or by means of salification with d-camphosulfonic acid and fractional crystallization e. g. from isopropanol; β-phenylserine cyclohexyl ester $C_6H_5CH.OHCH(NH_2)COOC_6H_{11}$ forming also part of the scope of the invention, as a new product.

Two examples of resolution of an ester of an α-amino acid according to the invention, with β-phenylserine cyclohexyl ester, and 1-pyrrolidone carboxylic acid and d-camphosulfonic acid respectively, are given hereinafter merely by way of illustration without limitation.

Example 1

2.0 g. of racemic threo-β-phenylserine are heated on boiling water bath during 2 hours with 10 cc. of cyclohexanol in a current of gaseous hydrochloric acid. On cooling, the hydrochloride of threo-β-phenylserine cyclohexyl ester, racemic, M. P. 164° C. (dec.) crystallizes, which if dissolved in 5 g. of water and treated with an equivalent of sodium bicarbonate yields racemic threo-β-phenylserine cyclo hexyl ester M. P. 94–94.5° C.

4.66 g. of racemic threo-β-phenylserine cyclohexyl ester are dissolved in 25 cc. of 95° ethanol and mixed hot with a solution of 2.33 g. of 1-pyrrolidone carboxylic acid in 7 cc. of ethanol. On cooling a crystalline mass of cotton-like needles are obtained, which if filtered and re-crystallized from 25 parts of ethanol yields 1-threo-β-phenylserine cyclohexyl ester N-1-pyroglutamate, M. P. 140–141° C. and $(\alpha)_D = -4.7 \pm 1°$ (c=2.98; methanol), from which by treatment with aqueous bicarbonate the 1-threo-β-phenylserine cyclohexyl ester is obtained, M. P. 47–48° C. and $(\alpha)_D = -20.7 \pm 2°$ (c=3.00; methanol).

From the mother liquor of crystallization, after concentrating to small volume, a product crystallizes in small prismatic needles arranged in rosettes, which after re-crystallization from 2 parts of ethanol yields d-threo-β-phenylserine cyclohexyl ester N-1-pyroglutamate, M. P. 128–128.5° C. and $(\alpha)_D = -0.5 + 1°$ (c=2.99; methanol); from which d-threo-β-phenylserine cyclohexyl ester, M. P. 49–50° C. and $(\alpha)_D = +21.7 \pm 0.5°$ (c=2.99; methanol), is obtained in the manner indicated above.

Example 2

6.6 of d,l-threo-β-phenylserine cyclohexyl ester obtained as in Example 1 are dissolved hot in 25 cc. of isopropanol and are added to a solution of 5,8 g. of d-camphosulfonic acid in 15 cc. of isopropanol. On cooling the d-threo-β-phenylserine cyclohexyl ester N-d-camphosulfonate crystallizes, which if re-crystallized from 8 parts of isopropanol melts at 172–173° C. and shows $(\alpha)_D = +26.9° \pm 0.5°$ (c=4.00; ethanol).

From the mother liquor of filtration, after previous concentration to small volume, the 1-threo-β-phenylserine cyclohexyl ester N-d-camphosulfonate crystallizes, which if re-crystallized from 2 parts of isopropanol, melts at 153.5°–154.5° and shows $(\alpha)_D = +13.7 \pm 1°$ (c=3.99; ethanol).

By proceeding in the manner indicated in Example 1, the d- and l-phenylserine cyclohexyl ester can be liberated from the two camphosulfonates respectively.

From the optically active esters obtained in the manner hereinbefore described, the corresponding optically active amino acids may be obtained by hydrolysis according to conventional methods.

We claim:
1. Racemic threo-β-phenylserine cyclohexylester as a new product.
2. Laevorotatory threo-β-phenylserine cyclohexylester as a new product.
3. Dextrorotatory threo-β-phenylserine cyclohexylester as a new product.

References Cited in the file of this patent

Berlingozzoti et al.: Gazz. Chim. Ital., 68, 721–728 (1938).
Carrara et al.: Gazz. Chim. Ital., 79, 856–862 (1949).
Leonard: J. Am. Chem. Soc., 72, 1316–1323 (1950).
Karrer: Organic Chemistry, 4th English Ed. (1950), page 104. Elsevier Book Co. Inc., 215 Fourth Ave., New York.
Vogler: Chem. Abst. 45, 5660 (1951).
Felkin et al.: Chem. Abst. 45, 8479 (1951).